(12) United States Patent  
Chithambaram et al.

(10) Patent No.: US 6,674,445 B1  
(45) Date of Patent: Jan. 6, 2004

(54) GENERALIZED, DIFFERENTIALLY ENCODED, INDEXED RASTER VECTOR DATA AND SCHEMA FOR MAPS ON A PERSONAL DIGITAL ASSISTANT

(75) Inventors: Nemmara Chithambaram, Novato, CA (US); Howard Marantz, Forestville, CA (US)

(73) Assignee: Autodesk, Inc., San Rafael, CA (US)

( * ) Notice: Subject to any disclaimer, the term of this patent is extended or adjusted under 35 U.S.C. 154(b) by 403 days.

(21) Appl. No.: 09/628,850

(22) Filed: Jul. 31, 2000

Related U.S. Application Data

(60) Provisional application No. 60/159,069, filed on Oct. 12, 1999, provisional application No. 60/193,141, filed on Mar. 29, 2000, provisional application No. 60/193,153, filed on Mar. 29, 2000, provisional application No. 60/193,142, filed on Mar. 29, 2000, and provisional application No. 60/193,862, filed on Mar. 30, 2000.

(51) Int. Cl.[7] .............................................. G06T 15/00
(52) U.S. Cl. ..................................................... 345/619
(58) Field of Search ................................. 345/419, 420, 345/424, 619, 620

(56) References Cited

U.S. PATENT DOCUMENTS

| | | | |
|---|---|---|---|
| 5,231,584 A | 7/1993 | Nimura et al. | 701/202 |
| 5,543,789 A | 8/1996 | Behr et al. | 340/995 |

(List continued on next page.)

FOREIGN PATENT DOCUMENTS

| WO | WO 97/07467 | 2/1997 |
|---|---|---|

OTHER PUBLICATIONS

M. Potmesil, "Maps Alive: Viewing Geospatial Information on the WWW," Computer Networks and ISDN Systems, 1997, 29: 1327–1342.

(List continued on next page.)

Primary Examiner—Phu K. Nguyen
(74) Attorney, Agent, or Firm—Gates & Cooper LLP

(57) ABSTRACT

A schema provides for the storage of geographic information on a personal digital assistant (PDA). Embodiments provide differential encoding and indexing of raster and vector based data. A schema provides for compact and performable storage of both data and metadata for raster, vector, and redlining information. A single database is utilized for mapset metadata and data. Timestamp/history information allows smart, incremental updates of the database. Indexing information allows compact and efficient storage and retrieval of objects and vector geometry. The schema allows a variable number of mapsets, maps, raster tiles, and geometry layers. Metadata for geometry types and redlining markup information are permitted. Geo-referencing information for raster and vector data allows the display of objects at the correct map location. Raster data is augmented with compact vector data. The vector data may be used for efficiently storing and retrieving the map data, allowing interactive selection, and the highlighting and querying of objects. Vectors are generalized by removing detail without losing shape information in a manner appropriate to PDA display resolution. Object location data is differentially encoded to provide precision using a fewer number of bytes (2 bytes per coordinate). The vector object includes spatial indexing information, to allow for spatial filtering of objects that fall within a specified view. Thus, the invention uses cartographic generalization, encoding, and indexing to provide for compact, and efficient spatial storage structures that deal with the PDA constraints of limited storage, processing power, memory and bandwidth.

33 Claims, 6 Drawing Sheets

U.S. PATENT DOCUMENTS

| | | | |
|---|---|---|---|
| 5,559,707 A | 9/1996 | DeLorme et al. | 701/200 |
| 5,673,421 A | 9/1997 | Shirakawa | 345/501 |
| 5,699,244 A | 12/1997 | Clark, Jr. et al. | 702/2 |
| 5,912,676 A * | 6/1999 | Malladi et al. | 345/531 |
| 5,938,721 A | 8/1999 | Dussell et al. | 701/211 |
| 5,966,135 A | 10/1999 | Roy et al. | 345/619 |
| 5,973,678 A | 10/1999 | Stewart et al. | 345/184 |
| 5,974,431 A | 10/1999 | Iida | 715/515 |
| 6,057,854 A | 5/2000 | Davis, Jr. et al. | 345/619 |
| 6,104,415 A * | 8/2000 | Gossett | 345/552 |

OTHER PUBLICATIONS

ARGU95, Argus User's Guide 3.0, The Next Generation in GIS, Munro Garrett International, May 1994, pp 176–180.

SOFT95, Specification for the Simple Vector Format (SVF) v1.1, article, SoftSource, Bellingham, Washington, 1995, pp 1–8.

XERO95, Map Viewer Technical Details, Xerox Corporation, Jun. 2, 1995, 3pp.

XERO95, Mapwriter (1) User Commands, Xerox Corporation Nov. 5, 1993, 4pp.

XERO95, About the Xerox PARC Map Viewer, Xerox Corporation, Jun. 1993, 1pp.

* cited by examiner

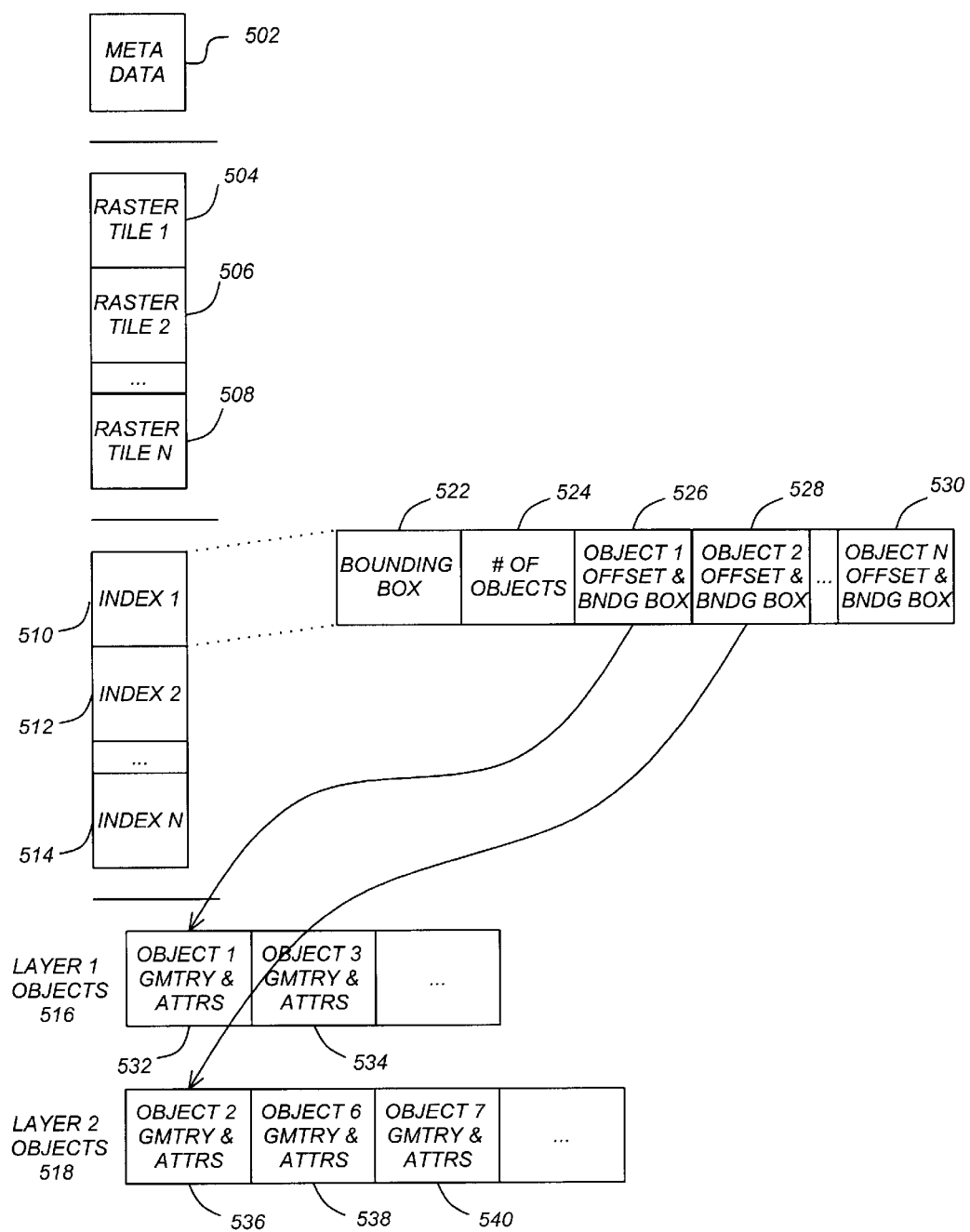

GENERALIZED, DIFFERENTIALLY ENCODED, INDEXED RASTER VECTOR DATA AND SCHEMA FOR MAPS ON A PERSONAL DIGITAL ASSISTANT

CROSS-REFERENCE TO RELATED APPLICATIONS

This application claims the benefit under 35 U.S.C. ≧119 (e) of the following and commonly assigned U.S. Provisional patent applications, which applications are incorporated by reference herein:

U.S. application Ser. No. 60/159,069, entitled "MAPGUIDE PERSONAL DIGITAL ASSISTANT," filed on Oct. 12, 1999, by Nemmara Chithambaram, et. al., U.S. application Ser. No. 60/193,141, entitled "SHARABLE SERVER UPLOADABLE REDLINING FOR PERSONAL DIGITAL ASSISTANT (PDA)," filed on Mar. 29, 2000, by Nemmara Chithambaram, et. al., U.S. application Ser. No. 60/193,153 entitled "INDEXED RASTER VECTOR SCHEMA FOR PERSONAL DIGITAL ASSISTANT (PDA) DATABASES," filed on Mar. 29, 2000, by Nemmara Chithambaram, et. al., U.S. application Ser. No. 60/193,142, entitled "INTER-PROCESS API AND GRAPHICAL USER INTERFACE FOR PERSONAL DIGITAL ASSISTANT (PDA) DEVICES AND APPLICATIONS," filed on Mar. 29, 2000, by Nemmara Chithambaram, et. al., U.S. application Ser. No. 60/193,862, entitled "MAPGUIDE FOR MOBILE DEVICES SERVER," filed on Mar. 30, 2000, by Nemmara Chithambaram, et. al., This application is related to the following and commonly assigned patent applications, which applications are incorporated by reference herein:

U.S. Pat. No. 6,337,693, issued on Jan. 8, 2002 (Application Ser. No. 09/411,506), entitled "VECTOR-BASED GEOGRAPHIC DATA", by Gregory A. Roy, et al., filed on Oct. 4, 1999, which is a continuation patent application of U.S. Pat. No. 5,966,135, issued on Oct. 12, 1999 (Application Ser. No. 08/757,706 filed on Oct. 30, 1996);

U.S. patent application Ser. No. 09/629,115, entitled "METHOD AND APPARATUS FOR PROVIDING ACCESS TO MAPS ON A PERSONAL DIGITAL ASSISTANT (PDA)", by Nemmara Chithambaram et al., filed on Jul. 31, 2000;

U.S. patent application Ser. No. 09/628,851, entitled "GEOGRAPHICAL DATA MARKUP ON A PERSONAL DIGITAL ASSISTANT (PDA)", by Nemmara Chithambaram et al., filed on Jul. 31, 2000; and U.S. patent application Ser. No. 09/629,117, entitled "METHOD AND APPARATUS FOR OBTAINING A SET OF MAPS", by Nemmara Chithambaram et al., filed on Jul. 31, 2000.

BACKGROUND OF THE INVENTION

1. Field of the Invention

The present invention relates generally to electronic maps and geographic information, and in particular, to a method, apparatus, and article of manufacture for storing maps and geographic data on a personal digital assistant (PDA).

2. Description of the Related Art

Computer implemented geographic information systems (GIS) are known in the art. Such GIS provide for the retrieval and display of geographic information (e.g., maps). A GIS is a system of software, hardware, and data that delivers geographic data (street maps, property boundaries, power transmission lines, etc.) along with any associated attribute information. It can show you where a street is and also tell you the street name, when it was last paved, whether it is a one-way street, etc. Using a GIS, a user can perform complex queries (from a web browser to a server) to discover such things as how many people live near the street, what their income level is, and what the zoning laws are. A GIS can operate on a network/internet wherein the geographic information is stored on a server and transmitted to a client/user where the information (map picture and other data) is displayed on a web browser.

For the client to properly display the geographic information, a computer system with the appropriate processing capabilities, software, and memory is required. For example, a client may be required to utilize a computer with a web browser such as INTERNET EXPLORER or NETSCAPE and have a minimum of 10 megabytes of available memory. Additionally, to display the geographic data such that a user does not have to wait an inordinate amount of time to retrieve and load the data, an appropriate internet connection (e.g., a 28.8 Kbps modem) and a computer system with significant processing power (e.g., a minimum speed of 100 megahertz) may be required.

Field/utility technicians such as gas company employees, salespersons, plumbers, insurance adjusters, or any type of employment that requires travel to different locations, often utilize or require access to maps and geographic information. Further, such technicians often need to interact with a map to obtain relevant information. For example, a plumber/contractor may want to determine where the main gas line or water line on a street is located. However, while out in the field, the technicians often do not have a network connection, and carrying a laptop or desktop computer is cumbersome and impractical. Thus, it is desirable to have a small (handheld) portable computing device with the capabilities to display and interact with geographic information both online and offline.

Prior art handheld computing devices (also referred to as palm PCs or personal digital assistants (PDAs)), are often used to access and utilize personal information. Many handheld computing devices are available in today's marketplace. Typically, handheld computing devices are only slightly larger than the size of one's palm (hence, the name palm PC) and have a small display screen for viewing a plethora of items. Software can be installed on a PDA to provide enhanced functionality. For example, a personal productivity tool may be installed to provide access to a calendar, contacts, email, Internet browsing, audio books, and audio recording capabilities. Card slots may also be available to provide additional memory or other functions (e.g., a modem). Additionally, some PDAs have infrared (IR) ports for communication.

The PDA environment, however, poses several challenges for geographic information systems in terms of memory, storage, processor speeds, wireless transmission rates, and display attributes. For example, PDAs commonly only maintain 96K or less of memory, 2 Mb (megabytes) or less storage, a 13 MHz processor speed, and a black and white or gray scale display mechanism. Further, field technicians using a PDA need to view and interact with maps displayed. The low bandwidth offered by wireless transmission services, coupled with the slow processors, result in unacceptable download times. Also, the technicians in many instances work in trenches or other places where it is not possible to establish a connection to the servers (requiring offline usage).

Thus, there is a need for a geographic information system that overcomes the above described deficiencies on a portable handheld electronic device such as a PDA.

To help better understand embodiments of the invention, it is useful to describe the data utilized in prior art geographic information systems. Prior art geographic information systems display map pictures that are generated using raster data. Raster data represents a map picture with points in a grid. For example, on an X-Y axis, there may be a thousand points in the X direction and seven hundred and sixty points in the Y direction. Each of these points represents a color. For example, some computer systems enable each point to represent one of eight colors. A map picture is then created by determining a color for each point in the grid.

Each map picture is static in that portions of the map picture cannot change independently of each other. That is, a portion of a map picture cannot be modified while viewing the map picture. Thus, while a map image may contain several layers of information, the information is merely a picture with no live data. When a portion of the map picture is to be modified, queried, or to perform any GIS analysis, the browser must request more data from the main server and the entire map picture is replaced. For example, each map picture, such as one representing the United States (US), may contain several layers of information, such as states, counties, and streets. When a user is viewing a map picture of the United States and wishes to view the counties in a particular state, the map picture is replaced with another map picture that contains the additional information. Typically, the additional information is stored at a server computer and the map picture is displayed at a client computer. When the map picture that is displayed is to be modified, the additional information is downloaded from the server computer. Because this additional information is in the form of raster data, it is typically time-consuming to download.

Additionally, some computer systems display schematics generated from vector-based data in computer aided design (CAD) files. Vector-based data uses descriptions of elements of the schematic to create the schematic. For example, if the schematic contains a line segment, the CAD file describes the line segment with an endpoint and a length. Moreover, these computer systems enable users to view data in CAD files from the Internet and Intranets. For instance, when a user at a computer system wishes to view a schematic, the computer system downloads all of the data in the CAD file for that schematic from a data storage device via the Internet. The CAD file typically contains data corresponding to different levels of design of the schematic. In some instances, a user may wish to view only some of the data in the files, for example, the highest level of design of the schematic. In this case, although only a portion of data is required to display the schematic requested by the user, the computer system has already downloaded all of the data in the CAD file. Because it is time-consuming to download all of the data, it is inefficient to do so when only a portion of the data is required to satisfy a user's request. Further, it may not be possible to download all or even a portion of the data onto a PDA.

SUMMARY OF THE INVENTION

One or more embodiments of the invention provide a schema for the storage of geographic information on a personal digital assistant (PDA). Further, embodiments provide for the differential encoding and indexing of raster and vector based data. The encoding, indexing, and storage schema provide the ability to view and interact with geographic information on a PDA.

The schema provides for the compact and performable storage of both data and metadata for raster, vector, and redlining information describing mapsets. A single database is utilized for mapset metadata and data. Timestamp/history information allows smart, incremental updates of the database. Indexing information allows compact and efficient storage and retrieval of objects and vector geometry. The schema allows a variable number of mapsets, maps, raster tiles, and geometry layers. Metadata for geometry types and redlining markup information are permitted. Additionally, geo-referencing information for raster and vector data allows objects to be displayed at the correct location on the map.

Raster data used for map display on the PDA is augmented with compact vector data. The vector data may be used for efficiently storing and retrieving the map data, allowing interactive selection, and the highlighting and querying of objects. The vectors are generalized by removing detail without losing shape information in a manner appropriate to the PDA display resolution. The object location data is differentially encoded to provide the required precision using a fewer number of bytes (2 bytes per coordinate). The vector object includes spatial indexing information, to allow for spatial filtering of objects that fall within a specified view. Thus, the invention uses cartographic generalization, encoding, and indexing to provide for compact, and efficient spatial storage structures that deal with the PDA constraints of limited storage, processing power, memory and bandwidth.

BRIEF DESCRIPTION OF THE DRAWINGS

Referring now to the drawings in which like reference numbers represent corresponding parts throughout:

FIGS. 5A, 5B, and 5C illustrate a storage structure in accordance with one or more embodiments of the invention.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

One or more embodiments of the invention provide for differentially encoding and indexing raster and vector based map data for use on a personal digital assistant. Raster maps provide multiple zoom levels with each zoom level comprising multiple tiles that allow for "virtual roaming" across a map. Further, raster zooms (by scaling existing raster tiles), selectable vector geometry (for interacting and highlighting with user objects), geo-referencing information for map navigation, meta-data in the form of layer definitions (visibility, display attributes, etc.), links to object attributes in databases, links to object reports generated by corporate web servers, uploadable, sharable redlining data (created from scribbles on the field), and access to geographical information both online and offline on the PDA are provided.

General Architecture

Hardware Environment

The use, on a PDA, of a modified MAPGUIDE GIS currently available from the assignee of the present invention is provided. The existing MAPGUIDE GIS is more fully described in commonly assigned and co-pending U.S. Pat. No. 6,337,693, issued on Jan. 8, 2002 (Application Ser. No. 09/411,506), entitled "VECTOR-BASED GEOGRAPHIC DATA", by Gregory Andrew Roy, et. al., Attorney Docket No. 30566.171USU1, filed on Oct. 4, 1999, which is a continuation patent application of U.S. Pat. No. 5,966,135 issued on Oct. 12, 1999 (application Ser. No. 08/757,706 filed on Oct. 30, 1996), by Gregory A. Roy et al., entitled "VECTOR-BASED GEOGRAPHIC DATA", which is incorporated by reference herein.

Figure 1:
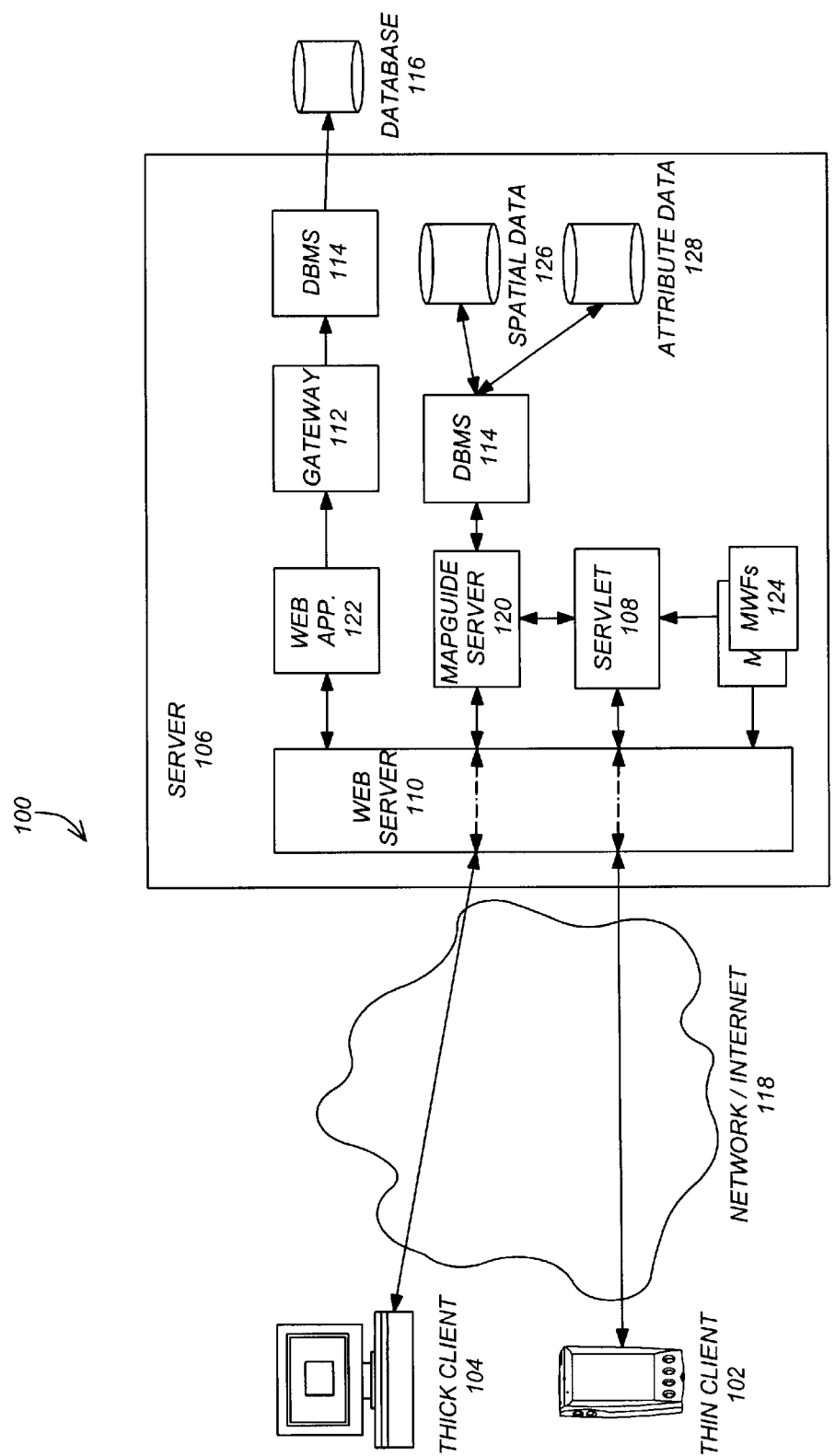
FIG. 1 schematically illustrates a hardware and software environment for the architecture in accordance with one or more embodiments of the invention.

FIG. 1 schematically illustrates a hardware and software environment for the architecture in accordance with one or more embodiments of the invention. A typical distributed computer system 100 uses a network/Internet 118 to connect technicians utilizing clients such as a thin client 102 (e.g. a PDA, WINCE, or PALM device) or a thick client 104 (e.g., a computer system running a browser) to server computers 106.

A thick client 104 as utilized in the existing MAPGUIDE GIS may comprise a computer with a web browser (enhanced with a plugin or viewer) connected to a server 110 that utilizes a MapGuide server 120 to retrieve data (e.g., raster data, spatial data format (SDF) data 126, attribute data 128, etc.).

A thin client includes three classes of devices: handheld personal computers (HPC), palm-held personal computers (PPC), personal digital assistants (PDA), and smart phones. Using these devices, a thin client 102 may not provide the full processing and memory capabilities as a thick client 104. For example, as described above with respect to PDAs, thin clients 102 often have memory less than 100K, storage of less than 2–4 MB, processor speeds of 13 MHz, and limited display attributes. Consequently, additional server 106 side support (e.g., more generalized display data, simplified project files, de-cluttering services, and possibly server management of user state) may be utilized. A typical combination of resources may include a network/Internet 118 comprising the Internet, LANs, WANs, SNA networks, or the like, clients 102 and 104 that are PDAs, personal computers or workstations, and servers 106 that are personal computers, workstations, minicomputers, or mainframes.

The network/Internet 118 connects client computers 102 and 104 executing the appropriate software applications to server computers 106 executing Web servers 110, servlets 108, MapGuide servers 120, etc. Servlets 108 may also be located within or part of Web server 110. The server 106 and its components may also be referred to as a back office system. Such a back office system maintains access to corporate databases, synchronization utilities, etc. The Web server 110 is typically a program such as IBM's HyperText Transport Protocol (HTTP) Server or Microsoft's Internet Information Server. The servlet 108 communicates with a thin client 102 through Web server 110 such that any additional processing required by a thin client 102 may be performed by the servlet 108. The servers 106 also execute a Common Gateway Interface (CGI) 112 (or Netscape Application Programming Interface (NSAPI), Internet Server Application Programming Interface (ISAPI), etc.), which interfaces between the Web server 110 and a database management system DBMS) 114 that may be utilized to retrieve relevant geographical data (such as SDF data, raster data, Open DataBase Connectivity (ODBC) data, etc.) from database 116.

Generally, components 108–116 and 120–128 all comprise logic and/or data that is embodied in or retrievable from a device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Thus, embodiments of the invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass logic and/or data accessible from any computer-readable device, carrier, or media.

Those skilled in the art will recognize many modifications may be made to this exemplary environment without departing from the scope of the present invention. For example, those skilled in the art will recognize that any combination of the above components, or any number of different components, including different logic, data, different peripherals, and different devices, may be used to implement the present invention, so long as similar functions are performed thereby. Specifically, those skilled in the art will recognize that the present invention may be applied to any database, associated database management system, or peripheral device.

Software Embodiments

In accordance with the hardware descriptions, thick clients 104 are complete computer systems with web browsers and full processing capabilities. However, the hardware limitations of a PDA device necessitate software limitations. Accordingly, to enable a geographic information system on a PDA, a thin client 102 is provided. To accommodate the thin client, additional support on server 106 may be utilized. For example, server 106 may provide more generalized display data, simplified project files, de-cluttering services, and possibly server management of the user state.

The architecture of the invention includes a data model that combines static raster layers (static raster data for multiple layers) with live vector objects to deliver good display and download performance, and also provides interactive selectable objects.

Vector based maps (also referred to as "map layer data" consisting of geographic information/data for one or more layers) are served by a servlet 108 and are an encoded and spatially indexed vector representation of the geographic data. Alternatively, the Scalable Vector Graphics (SVG) representation as proposed by the WorldWideWeb Consortium (W3C) may be utilized. SVG allows for three types of graphic objects: vector graphic shapes (e.g., paths consisting of straight lines and curves), images, and text. Graphical objects can be grouped, styled, transformed, and composited into previously rendered objects.

A display background (that is raster based) for the geographic data and display layers is managed as a multi-level library of raster tiles. The raster layers are composed from multiple vector layers on servlet 108, resulting in better download and display performance. The raster map on the PDA allows panning (virtual roaming paradigm), and zooming across discrete multiple levels. A smart-cache on thin client 102 allows the swapping of compact tiles from the database to memory, in a manner appropriate to the device.

A single workspace per map provides the definition of the map and the display attributes for the layers on the thin client 102. However, the workspace does not contain static layer data and is based on a lightweight storage structure.

Object Data Encoding

Figure 2:
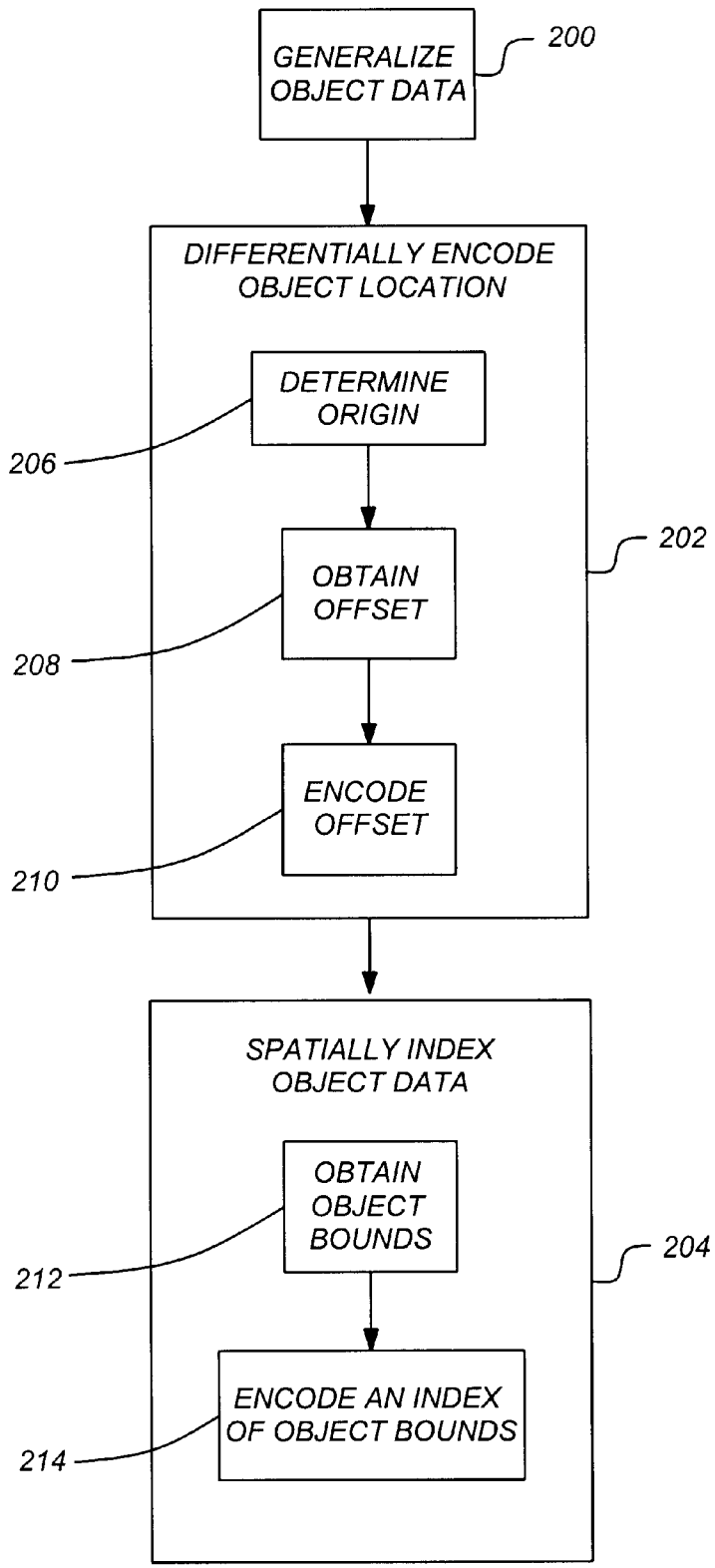
FIG. 2 is a flow chart describing servlet functionality in accordance with one or more embodiments of the invention.

As described above, servlet 108 provides for generalizing, differentially encoding, and indexing geographic data and information. FIG. 2 is a flow chart describing this servlet 108 functionality. The geographic data associated with a map may include one or more objects (e.g., a building, power line, water main, etc.). Such objects may vary in their shape and definition. Further, a significant amount of memory may be required to store the pixel/vector information for the shape. At step 200, the object data is generalized (referred to as cartographic generalization). Generalizing the object data 200 comprises generalizing the shape of the object such that less data is utilized to record/store the object's information (e.g., pixel or vector data) without losing shape information. Thus, points, pixels, or vectors of an object may be filtered out. A tolerance range may be specified wherein any points or vectors within the tolerance range are filtered out such that only two points (and the line defined by the points) are utilized.

For example, instead of storing every pixel or vector in a line, if the tolerance range is from two (2) millimeters or ten (10) pixels to fifteen (15) millimeters or sixty (60) pixels, as long as the points of an object are within the specified range, all of the individual points are reduced to a starting and ending point. A point on the object is selected. A straight line is drawn utilizing the slope of the object for direction. When the points of the object are outside of the range, an endpoint is selected (which also becomes the new starting point) and a new line begins in a direction of the changed slope of the boundary of the object.

Figure 3:
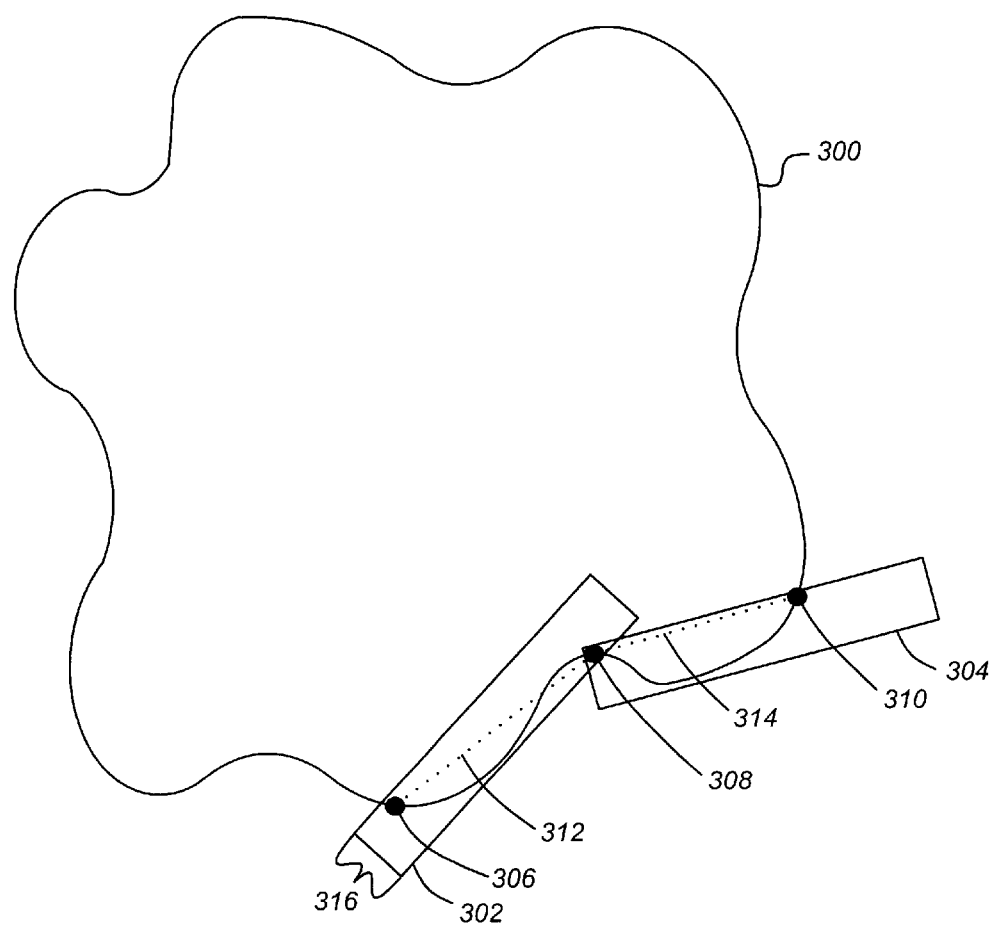
FIG. 3 illustrates the generalization of an object geometry in accordance with one or more embodiments of the invention.

FIG. 3 illustrates the generalization 200 of an object in accordance with one or more embodiments of the invention. Object 300 is irregularly shaped and contains multiple points to define the curves of the object. The generalization process (step 200) begins at a point 306 of object 300. The range in FIG. 3 is the width 316 of boxes 302 and 304. Accordingly, when the boundary of object 300 begins to protrude outside of box 302, another point 308 on the boundary of object 300 is selected and a line 312 is drawn between the two points 306 and 308. Point 308 then becomes the starting point for the next line 314 of the generalized object. Once again, a box may be used to determine when the boundary protrudes beyond the range (e.g., width 316) specified. Once the boundary of object 300 protrudes beyond the range specified, endpoint 310 is selected and line 314 is utilized as part of the generalized object. As an alternative to generalizing object 300 in this manner, a comparison to other likely shapes may be utilized (e.g., a circle) and selected if appropriate. Such a substitute shape may be described in terms of an equation (e.g., specifying a center point and radius). However, any other generalization method may be utilized.

The tolerance level/range may vary depending on the device (e.g., a PDA) being utilized to display the data. Additionally, the generalization may utilize existing algorithms for generalizing the shape of an object.

Figure 4:
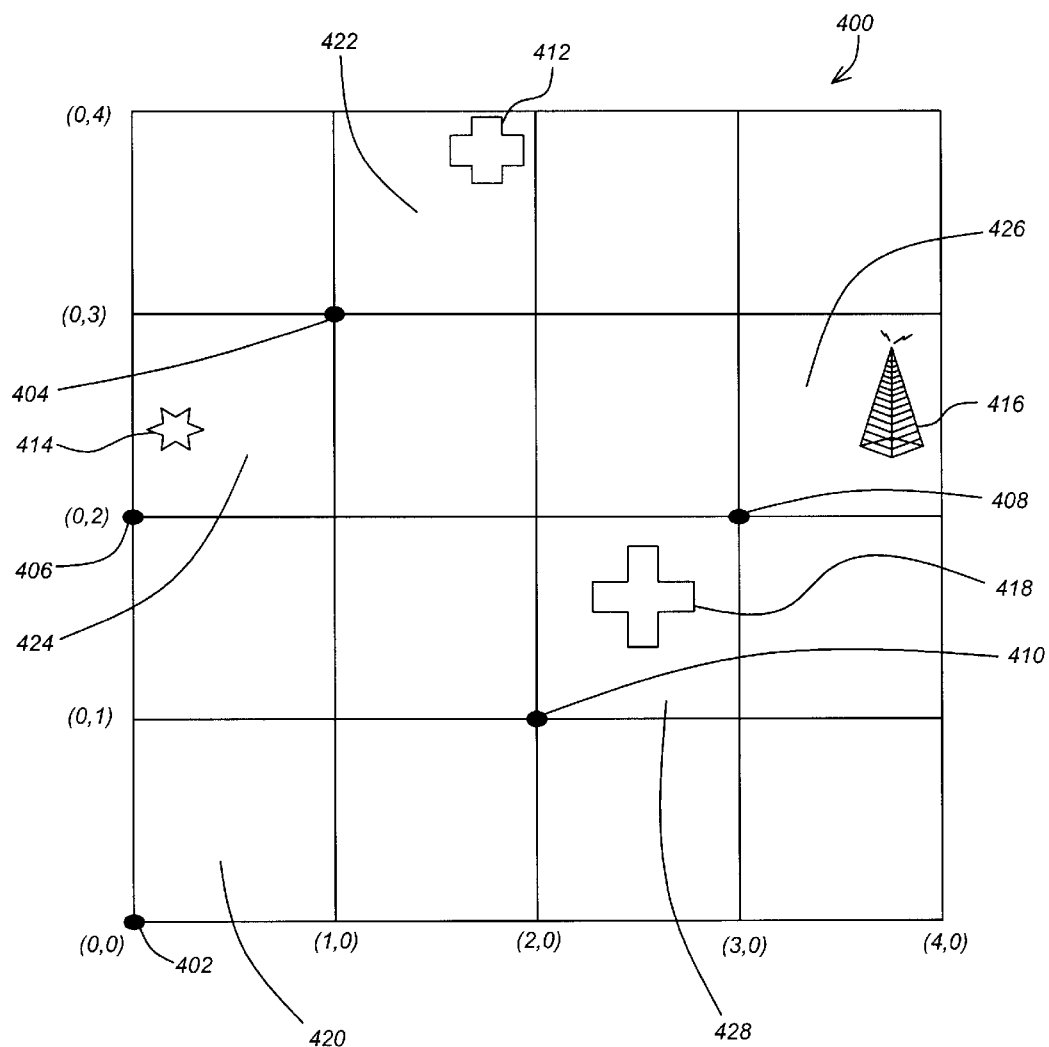
FIG. 4 illustrates a map with objects in accordance with one or more embodiments of the invention.

At step 202, the object location is differentially encoded. FIG. 4 illustrates a map 400 with objects 412–418. Traditionally, to encode the location of an object 412–418 on a map, the coordinates of all of the objects 412–418 are established from a single point of origin 402. For example, the location of object 418 may be encoded as (2.25, 1.49) and the location of object 412 may be (1.55, 3.75). However, if a map depicts a large geographical area, the offset for the location of the object with respect to a single point of origin 402 may comprise a significant number of bytes to encode.

As described above, the map 400 may be stored as a sequence of one or more raster layers/tiles 420–428. One or more objects 412–418 may be located in one or more of the tiles 420–428. Instead of encoding the offset for each object 412–418 with respect to a single point of origin 402, each object 412–418 offset may be encoded by encoding the offset from the point of origin 404–410 based on the tile 420–428 where each object 412–418 is located. Consequently, the offset from the point of origin 404–410 for each tile 422–428 is utilized and not the offset from the point of origin 402. Thus, instead of encoding (2.25, 1.49) as the offset for object 418, the offset (.25, .49) is encoded. Similarly, instead of encoding (1.55, 3.75) as the offset of object 412, the offset (.55, .74) is encoded. Since the offset based on a tile 420–428 origin is not as large as the offset from a single unrelated point of origin 402, fewer bytes (e.g., two bytes per coordinate) are required to encode the object 412–418 location.

Accordingly, differential encoding step 202 comprises steps 206–210. At step 206, the origin 402–410 for the tile 420–428 containing the object 412–418 is determined. At step 208, the offset for the location of the object 412–418 is obtained and at step 210 the offset is encoded.

At step 204, the object 412–418 data is spatially indexed. Spatially indexing 204 the object 412–418 comprises encoding the bounding box of the object 412–418 and allows for the spatial filtering of objects 412–418 that fall within a specified view/tile 420–428. Accordingly, at step 212, the object 412–418 bounds are obtained and the bounds are encoded at step 214. By encoding the bounding box of an object 412–418, instead of examining the objects 412–418 within a particular view/tile 420–428, the bounding boxes within a view/tile 420–428 are examined thereby providing the a simpler mechanism for filtering out undesirable/unnecessary objects. Consequently, the determination of when a particular object 412–418 has been selected is simpler. The object 412–418 bounds may be maintained in an index of the map database (the database containing all of the map information to be used by the PDA).

Similar to indexing the boundary of each object 412–418, an index may also be maintained for the boundary of each tile 420–428. Accordingly, when a user clicks on a screen, the boundaries for the tiles 420–428 may be examined to determine the tile that has been selected. To determine which object 412–418 (within a tile 420–428) has been selected, only those objects 412–418 within the selected tile 420–428 need to be examined (i.e., the remaining objects 412–418 are filtered out). Further, as described above, instead of examining the individual geometric attributes for each object 412–418, only the boundaries/bounding boxes of the objects 412–418 within the selected tile need to be examined. Since bounding boxes are not as complex (i.e., comprise only two points) and consume considerably less memory than the complete attributes of an object 412–418, searching for the selected object 412–418 is easier and the storage of the object location consumes less memory. By examining the bounding box of one or more objects 412–418 instead of the details of the object 412–418, those objects 412–418 not in the area selected can be easily eliminated from those that may have been selected. Additionally, once the object 412–418 has been identified, only the detailed vector data for the object 412–418 selected is examined instead of examining the detailed vector data (e.g., the attributes and geometry) of every object 412–418. Accordingly, less processing time and memory is needed to determine when a particular object has been selected.

Thus, the generalization, differential encoding, and spatial indexing provide the ability to efficiently store and retrieve the map data, and allow the interactive selection, highlighting, and querying of objects 420–428.

Storage Schema/Structure

To efficiently utilize the generalization, differential encoding, and spatial indexing described above, the database conforms to a storage schema/structure. The storage schema and structure provide the ability to efficiently utilize the above described principles and to determine the tile 420–428 where an object 412–418 is located. The storage schema further provides a compact, yet performable PDA database for both data and metadata for raster, vector, and redlining information describing mapsets.

Figure 5A:
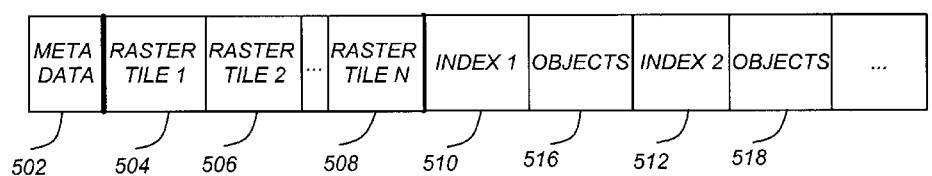
Figure 5B:
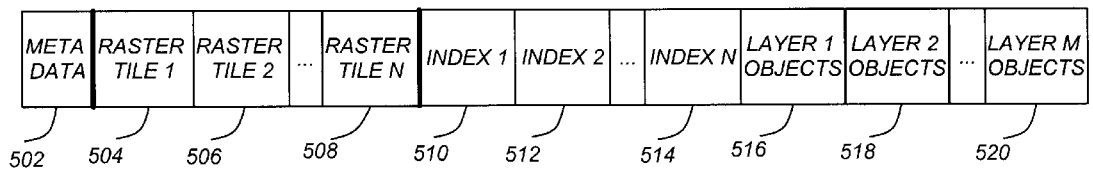

FIGS. 5A, 5B, and 5C illustrate the storage structure in accordance with one or more embodiments of the invention. Metadata (index information) 502 is stored first in the database. Metadata 502 contains information regarding version information (of the servlet 108), update, creation, and download timestamp/history information, the number of mapsets/tiles in the database, the size of the mapset (i.e., the size of the map), and geo-referencing information. The timestamp and history information provides the ability to allow smart, incremental updates of the database. The storage of the number of mapsets/tiles enhances the ability to utilize a variable number of mapsets, maps, raster tiles, and geometry layers. The geo-reference information allows the determination of the location of the mapset/map on a coordinate system and the display of objects 412–418 at the correct location on the map. Referring to FIGS. 5A and 5B, subsequent to metadata information 502, the raster data 504–508 for tiles 1–N 420–428 is stored, followed by the indexes 1–N 510–514 for each tile 420–428 and the generalized vector object data 516–520 for objects 1–M in each layer. Accordingly, the schema provides for a single database for mapset metadata 502 and data 504–520.

The raster data 504–508 for the tiles 420–428 is stored as a series of records in the database in row major format (i.e., in sequential order starting from the upper left and continuing across the row before proceeding to the next row). Immediately after the raster data 504–508 for the tiles 420–428 is encoded, an index 510–514 for each tile 420–428 is encoded. The indexes 510–514 are stored as sequential records in the database such that the order of storage directly corresponds to the raster tile 504–506 storage order. Accordingly, if there are sixteen (16) records for tiles 420–428 stored, sixteen (16) records for indexes 510–514 are encoded such that the first index 510 corresponds to the first tile 504, the second index 512 corresponds to the second tile 506, etc. If there are no objects 412–418 in a tile 420–428, the index record 510–514 is empty.

FIG. 5C illustrates the information maintained in indexes 510–514. Indexes 510–514 contain the bounding box 522 for the corresponding raster tile 504–508, the number of objects 524 in the corresponding raster tile 504–508, and object reference information 526–530 for each object in the corresponding raster tile 504–508. The object reference information 526–530, contains the object's offset, object's bounding box 526–530, and a pointer/reference to the location of the generalized vector object data (i.e., the detailed object information) 516–520.

Accordingly, subsequent to encoding the indexes 510–514, the generalized vector object data 516–520 is stored/encoded. As illustrated in FIG. 5A, the generalized vector object data 516–520 (representative of one or more objects 412–418) for each tile 420–428 may be encoded immediately after the index 510–514 for the tile 420–428. Alternatively, as illustrated in FIG. 5B, all of the indexes 510–514 may be encoded and followed by all of the generalized vector object data 516–520 organized by layers sequentially.

Referring to FIG. 5C, the object reference information 526–530 includes a pointer/reference to the location of the generalized vector object data 532–540 for the corresponding object. Thus, the object reference information 526 for object 1 maintains a pointer to the beginning of record 532 which contains the geometry and attributes for object 1. Similarly, the object reference information 528 for object 2 maintains a pointer to the beginning of record 536 which contains the geometry and attributes for object 2. The attributes stored in records 532–540 may include a URL, an id, and other relevant information.

By storing the geographical data as illustrated in FIGS. 5A, 5B, and 5C, it can be easily determined which tile 420–428 an object 412–418 is located in. With the size of the rectangular map grid 400 and the number of tiles 420–428 known (from metadata 502), the size of each tile 420–428 is known (i.e., divide the map area 400 by the number of tiles 420–428). The raster tile data 504–508 (one per record) is then stored. Subsequently, the index 510–514 for each raster tile 504–508 is stored followed by the generalized vector object data 516–520 by layer. Thus, if records 318 contain the raster data 504–508 for 16 tiles 420–428, records 19–34 contain the indexes 510–514 corresponding to the tiles 420–428. Accordingly, the selection of an object 412–418 contained within a tile 420–428 can be easily identified by examining the appropriate index record 510–514 (i.e., the bounding boxes of the objects in object reference information 526–530). Such identification is useful since vector data 516–520 for the objects 420–428 is not needed or examined until after the object 420–428 is selected.

As described above, the index 510–514 contains the bounds 522 of the tile 420–428, the number 524 of objects 412–418 within the tile 420–428, and an array containing object reference information 526–530 for each object 412–418 in the tile 420–428. The object reference information 526–530 contain the object bounds, a reference to the generalized vector object data 532–540, and the offset for the location of the object 412–418 with respect to the origin 404–410 for the containing tile 420–428. Thus, the indexes 510–514 (in particular, the object reference information 526–530) contain the spatial indexing (e.g., the objects' bounds) and differential encoding (e.g., objects' offset) information.

In addition to containing the above-identified information, the schema may also provide for the storage of metadata for geometry types and redlining markup information. The metadata for geometry types includes the number of vertices of an object and the geometrical shape of the object. The redlining markup are associate with, the number of redline layers, and a reference to the one or more objects containing the redline/markup.

Conclusion

This concludes the description of one or more embodiments of the invention. The following describes some alternative embodiments for accomplishing the present invention.

For example, any type of personal digital assistant, WINCE device, etc. can be utilized as a thin client 102. Further, any type of computer, such as a mainframe, minicomputer, or personal computer, or computer configuration, such as a timesharing mainframe, local area network, standalone personal computer, etc. can be used as a server 106.

In summary, a geographic information system on a personal digital assistant or thin client provides for a database schema and the generalization, differential encoding, and indexing of geographic data.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A system for accessing object data relating to geographical information comprising:
    (a) a server;
    (b) a servlet executing on the server, the servlet configured to:
        (i) obtain a map comprised of multiple raster tiles;
        (ii) obtain vector object data for an object of the map;
        (iii) generalize a shape of the object by filtering out some of the vector object data;
        (iv) differentially encode a location of the object by encoding an offset for the location of the object with respect to an origin of the raster tile where the object is located;
        (v) spatially index the vector object data by encoding the bounds of the object.

2. The system of claim 1 wherein the offset and bounds are encoded in an index.

3. The system of claim 2 wherein the raster tiles are stored in row major format followed by the index for each raster tile stored in an order corresponding to the storage of the raster tiles.

4. The system of claim 2 wherein the servlet is further configured to encode in the index a reference to a record containing the generalized vector object data.

5. The system of claim 1 wherein the servlet is further configured to transmit the generalized, spatially indexed, differentially encoded object data to a personal digital assistant.

6. The system of claim 1 wherein the storage of the generalized, spatially indexed, differentially encoded object data provides for determining the object identified by a point by:
    evaluating bounds of one or more raster tiles to determine the raster tile containing the point; and
    evaluating the bounds of objects within the raster tile containing the point to determine which object contains the point.

7. A system for accessing object data relating to geographic information comprising:
    (a) a personal digital assistant;
    (b) an application on the personal digital assistant, the application configured to:
        (i) obtain a map comprised of:
            (A) raster tile data;
            (B) a generalized shape of one more objects located within the raster tiles;
            (C) one or more offsets for locations of each objects with respect to an origin of the raster tile where each object is located; and
            (D) one or more bounds of each object; and
        (ii) display the map on a screen of the personal digital assistant.

8. The system of claim 7 wherein the offset and bounds are encoded in an index.

9. The system of claim 8 wherein the raster tiles are stored in row major format followed by the index for each raster tile stored in an order corresponding to the storage of the raster tiles.

10. The system of claim 8 wherein the map further comprises a reference to a record containing generalized vector object data for the object.

11. The system of claim 7 wherein the application on the personal digital assistant is further configured to determine the object identified by a point selected by:
    evaluating bounds of the one or more raster tiles to determine the raster tile containing the point; and
    evaluating the bounds of objects within the raster tile containing the point to determine which object contains the point.

12. A method of storing object data relating to geographic information comprising:
    (a) obtaining a map comprised of multiple raster tiles;
    (b) obtaining vector object data for an object of the map;
    (c) encoding the multiple raster tiles;
    (d) generalizing a shape of the object by filtering out some of the vector object data;
    (e) encoding the generalized shape of the object;
    (f) differentially encoding a location of the object by encoding an offset for the location of the object with respect to an origin of the raster tile where the object is located; and
    (g) spatially indexing the vector object data by encoding the bounds of the object.

13. The method of claim 12 wherein the offset and bounds are encoded in an index.

14. The method of claim 13 wherein the raster tiles are stored in row major format followed by the index for each raster tile stored in an order corresponding to the storage of the raster tiles.

15. The method of claim 13 further comprising encoding in the index a reference to a record containing the generalized vector object data.

16. The method of claim 12 further comprising transmitting the generalized, spatially indexed, differentially encoded object data to a personal digital assistant.

17. The method of claim 12 further comprising determining the object identified by a point by:
    evaluating bounds of one or more raster tiles to determine the raster tile containing the point; and
    evaluating the bounds of objects within the raster tile containing the point to determine which object contains the point.

18. A method of displaying object data relating to geographic information on a personal digital assistant comprising:
    (a) obtaining a map comprised of:
        (i) multiple raster tiles;
        (ii) a generalized shape of an object;

(iii) an offset for the location of the object with respect to an origin of the raster tile where the object is located; and (iv) the bounds of the object;

(b) displaying the map on a screen of the personal digital assistant.

19. The method of claim 18 wherein the offset and bounds are encoded in an index.

20. The method of claim 19 wherein the raster tiles are stored in row major format followed by the index for each raster tile stored in an order corresponding to the storage of the raster tiles.

21. The method of claim 18 wherein the map further comprises a reference to a record containing generalized vector object data for the object.

22. The method of claim 18 further comprising determining the object identified by a point by:

evaluating bounds of one or more raster tiles to determine the raster tile containing the point; and evaluating the bounds of objects within the raster tile containing the point to determine which object contains the point.

23. An article of manufacture comprising a program storage medium readable by a computer hardware device and embodying one or more instructions executable by the computer hardware device to perform a method for storing object data relating to geographic information, the method comprising:

(a) obtaining a map comprised of multiple raster tiles;

(b) obtaining vector object data for an object of the map;

(c) encoding the multiple raster tiles;

(d) generalizing a shape of the object by filtering out some of the vector object data;

(e) encoding the generalized shape of the object;

(f) differentially encoding a location of the object by encoding an offset for the location of the object with respect to an origin of the raster tile where the object is located; and (g) spatially indexing the vector object data by encoding the bounds of the object.

24. The article of manufacture of claim 23 wherein the offset and bounds are encoded in an index.

25. The article of manufacture of claim 24 wherein the raster tiles are stored in row major format followed by the index for each raster tile stored in an order corresponding to the storage of the raster tiles.

26. The article of manufacture of claim 24 wherein the method further comprises encoding in the index a reference to a record containing the generalized vector object data.

27. The article of manufacture of claim 23, the method further comprising transmitting the generalized, spatially indexed, differentially encoded object data to a personal digital assistant.

28. The article of manufacture of claim 23, the method further comprising determining the object identified by a point by:

evaluating bounds of one or more raster tiles to determine the raster tile containing the point; and evaluating the bounds of objects within the raster tile containing the point to determine which object contains the point.

29. An article of manufacture comprising a program storage medium readable by a computer hardware device and embodying one or more instructions executable by the computer hardware device to perform a method for displaying object data relating to geographic information, the method comprising:

(a) obtaining a map comprised of:
(i) multiple raster tiles;
(ii) a generalized shape of an object;
(iii) an offset for the location of the object with respect to an origin of the raster tile where the object is located; and
(iv) the bounds of the object;

(b) displaying the map on a screen of the article of manufacture.

30. The article of manufacture of claim 29 wherein the offset and bounds are encoded in an index.

31. The article of manufacture of claim 30 wherein the raster tiles are stored in row major format followed by the index for each raster tile stored in an order corresponding to the storage of the raster tiles.

32. The article of manufacture of claim 29 wherein the map further comprises a reference to a record containing generalized vector object data for the object.

33. The article of manufacture of claim 29, the method further comprising determining the object identified by a point by:

evaluating bounds of one or more raster tiles to determine the raster tile containing the point; and evaluating the bounds of objects within the raster tile containing the point to determine which object contains the point.

* * * * *